June 5, 1951

R. G. BOURDON ET AL 2,556,024

WHEEL SUPPORT WITH ADJUSTABLE TOOL SUPPORTING AND CENTERING MEANS

Filed Aug. 9, 1948

3 Sheets-Sheet 1

INVENTOR
RUSSELL G. BOURDON
NAPOLEON X. DEROUIN
By Liverance and Van Antwerp
ATTORNEYS June 5, 1951  R. G. BOURDON ET AL  2,556,024
WHEEL SUPPORT WITH ADJUSTABLE TOOL SUPPORTING
AND CENTERING MEANS
Filed Aug. 9, 1948  3 Sheets-Sheet 2

INVENTOR
RUSSELL G. BOURDON
NAPOLEON X. DEROUIN
BY Liverance and
Van Antwerp
ATTORNEYS

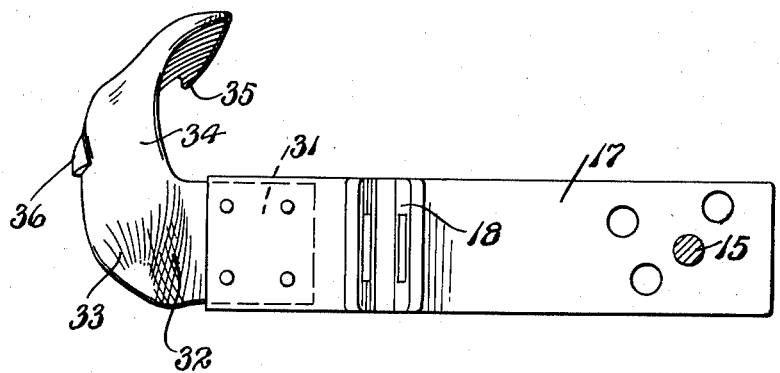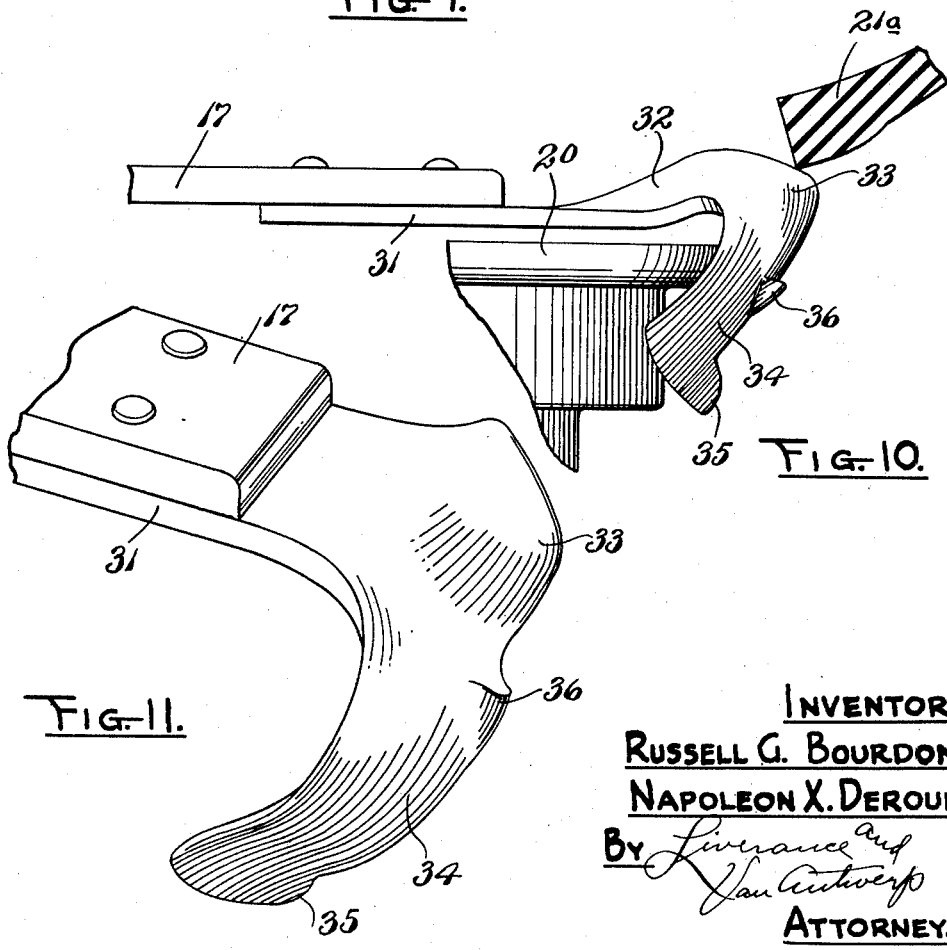

Patented June 5, 1951

2,556,024

UNITED STATES PATENT OFFICE 2,556,024

WHEEL SUPPORT WITH ADJUSTABLE TOOL SUPPORTING AND CENTERING MEANS

Russell G. Bourdon and Napoleon X. Derouin, Muskegon, Mich.

Application August 9, 1948, Serial No. 43,191

2 Claims. (Cl. 144—288)

1

The present invention relates to an apparatus or appliance to facilitate the removal of a standard automobile tire casing from its wheel rim; also to facilitate the replacing thereof on the rim. The outer tire casing, or shoe as it is sometimes called, of an automobile tire is many times difficult to remove from the wheel rim at one or both sides, and likewise its replacement is equally difficult. The bead portions of the tire casing must be subjected to a heavy tension force to get them over the edges of a wheel rim either in removing or replacing. Removal and replacement of the outer casings of automobile tires, as in the repair of inner tubes, the interchange of casings on different wheels of an automobile, or the placing of a new tire upon a wheel, occurs very frequently, and it is a primary object and purpose of our invention to provide an appliance, and tire tools usable therewith, by means of which the outer casing of a tire is made more easy of removal, including an initial separation of the tire beads from surface engagement with the interior of the sides of the wheel rim against which they bear, and with respect to which they may have a strong adhering connection. Furthermore, the replacement of the beads of a tire casing from outside the wheel rim to the inside thereof is much more readily and easily obtained with our invention.

Figure 1:
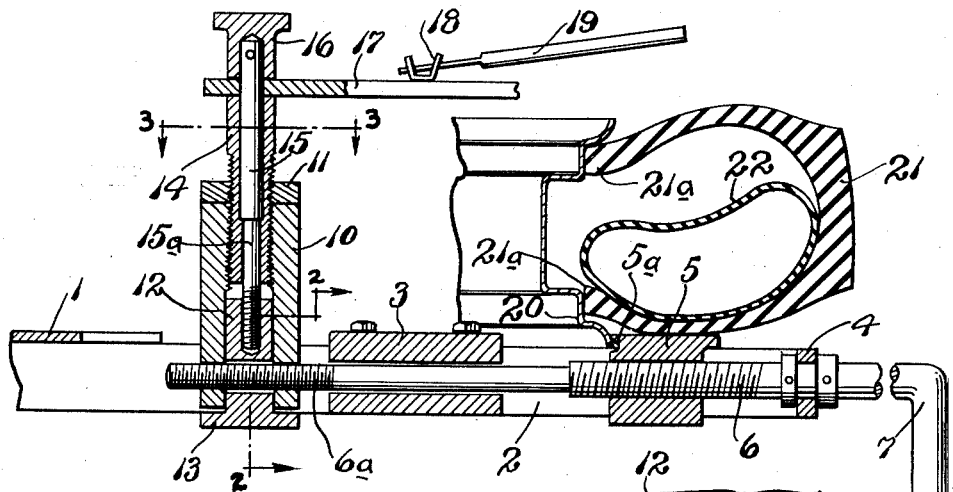
Figure 2:
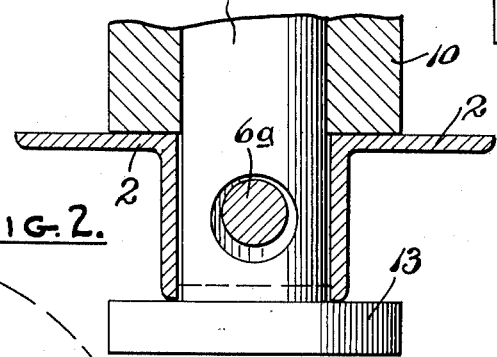
Figure 3:
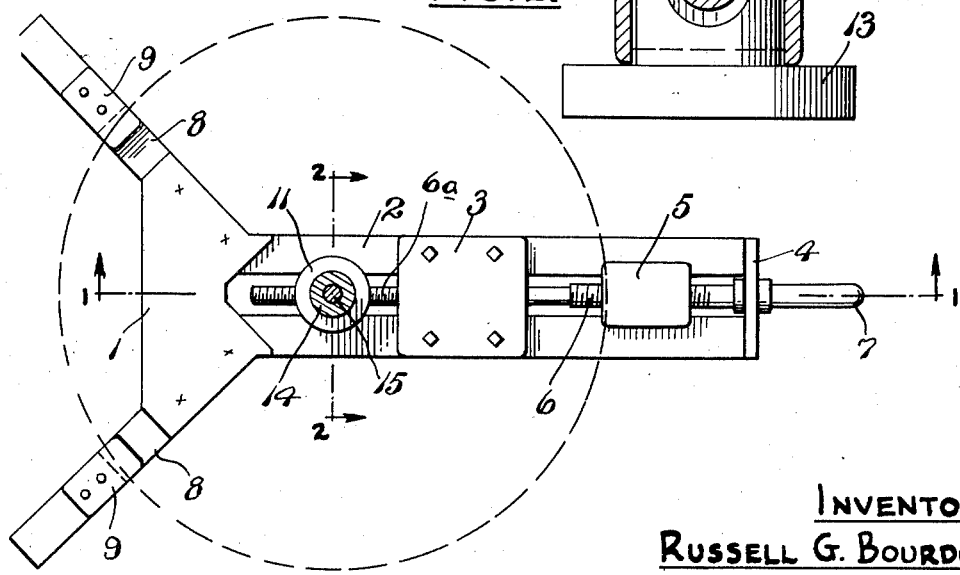
Figure 4:
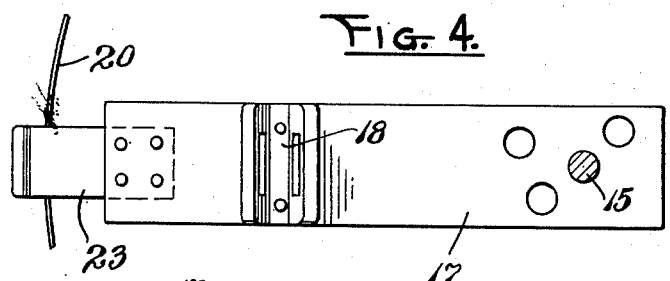
Figures 5, 6:
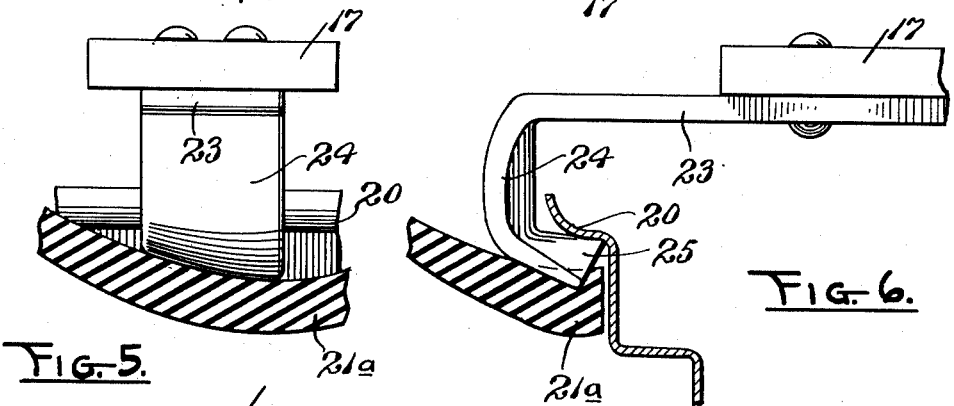
Figure 7:
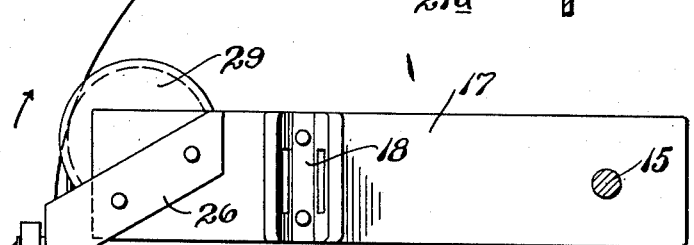

An understanding of the invention may be had from the following description, taken in connection with the accompanying drawings, in which:

Fig. 1 is a vertical section, somewhat fragmentary and enlarged, through the tire tool appliance of our invention, the plane of the section being substantially that indicated at 1—1 on Fig. 3, Fig. 2 is a fragmentary enlarged transverse vertical section, substantially on the plane of line 2—2 of Fig. 3, Fig. 3 is a plan view of the tire removing and applying appliance, partly in horizontal section, the section being on the plane of line 3—3 of Fig. 1, Fig. 4 is a plan view of a tool carrying arm, and a special tool connected therewith at one end, for breaking the edge of a tire casing loose from the side of a rim to which it adheres, Fig. 5 is an enlarged end elevation thereof, with a portion of the tire shown in section, showing the tire bead in the process of being thus broken loose, Fig. 6 is a side elevation of Fig. 4, illustrating the breaking loose step of tire casing removal, Fig. 7 is a plan similar to Fig. 4 of a tool carrying arm, with a tire tool secured at one end

Figure 8:
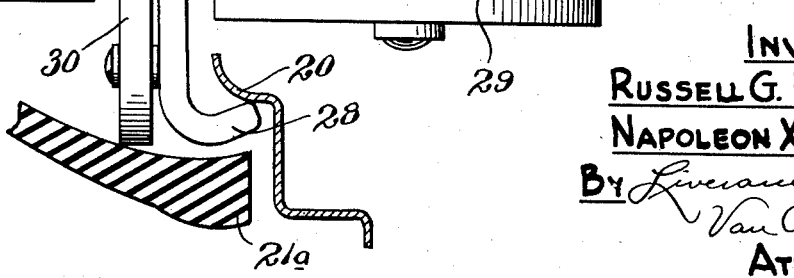

2 thereof, which is used in replacing one of the side beads of a tire casing on the wheel rim with which it is to be connected, Fig. 8 is a side elevation thereof, Fig. 9 is a plan view of a tool carrying arm, and a tool connected thereto at one end, used in disconnecting the tire at one side on a wheel rim after a breaking loose therefrom, Fig. 10 is an elevation illustrating the use of the tool in such tire disconnection, and Fig. 11 is a fragmentary enlarged perspective view of the outer end of such tire disconnecting tool.

Like reference characters refer to like parts in the different figures of the drawings, and the sections are taken looking in the directions indicated by the arrows.

In the construction shown, a supporting fixture to which a wheel with a tire thereon which is to be removed is adapted to be detachably secured, includes in its structure a flat plate 1, of the form best shown in Fig. 3, to which two angle bars 2 are welded and extend at one side therefrom in spaced parallel relation. A block 3 may be secured to and bridge the angle bars 2 between the ends thereof, and at the outer ends of the bars 2 a cross connecting bar 4 is permanently secured.

An adjustable wheel rim engaging member 5 is slidably mounted on the bars 2 between the block 3 and the end member 4, at its inner upper edge portion having a recess 5a adapting it to engage the edge of a tire rim as shown in Fig. 1. A rod 6 is threaded and passes through the rim engaging member 5, which has an interiorly threaded passage therefor, and is held by collars against longitudinal movement where it passes through the member 4. At its outer end it is provided with a handle 7 for manually turning the rod. The turning of the rod in opposite directions adjusts the rim engaging member 5 inwardly or outwardly in accordance with the direction of turning.

Two arms 8 are secured at the opposite side of the plate 1 and diverge outwardly as shown, each at its upper side being equipped with a rim engaging block or member 9, each of which will be recessed similar to the recess 5a at its inner edge. It is therefore apparent that when a wheel with a tire thereon is located over the engaging and supporting fixture which has been described, by turning the rod 6 by means of the handle 7, the rim of the wheel is engaged at three spaced points by the tire engaging members 5 and 9 and is securely held against movement and connected to said fixture, which in practice is adapted to be located and secured horizontally, for example at the upper side of the top of a bench, permanently fastened to the bench in a service station or other place where the outer casings of tires are removed.

A vertical sleeve 10, at its upper end having associated a plate 11 (Fig. 1), is mounted at its lower end, at opposed sides, against the upper sides of the spaced apart angle bars 2, and has portions thereof extending downwardly between said bars. Said sleeve at its lower end receives an inwardly extending vertical boss 12 of a securing member, which at its lower end has a disklike head 13, which at opposed edge portions comes against the lower edges of the vertical legs of the bars 2 and may be drawn upwardly to clamp the sleeve 10 in fixed relation to the bars 2. The rod 6 has a reduced diameter portion 6a extending therefrom passing freely through an opening in the block 3. It is threaded at its inner end and passes through threaded openings in the opposite sides of the sleeve 10 and freely through a relatively large opening in the boss 12. The threads on the rod 6 are of twice the pitch of the threads 6a. Therefore the sleeve 10 is automatically positioned, when the supporting fixture has a wheel rim secured thereto, at the center of the wheel and extends upwardly through it.

The upper end portion of the sleeve 10 and the disk or plate 11 above it are interiorly threaded. A sleeve 14 of relatively small diameter is screwed downwardly into the sleeve 10 and plate or disk 11, and is therefore adjustable to different positions and is held in any position to which adjusted by tightening the nut 11. A rod 15 having a reduced lower end portion 15a passes through the sleeve 14, the lower end of the part 15a being threaded and screwing into the upper end of the boss 12. At the upper end of the rod 15 a head 16 is permanently secured, by means of which it may be turned so as to draw the disk 13 against the lower edges of the bars 2 to secure the sleeve 10 in fixed relation to the supporting fixture, after a wheel rim is engaged by the members 5 and 9, and with the sleeve 10 located at the center of the wheel and extending upwardly through it.

Any one of a multiple of tire tool carrying bars 17 are adapted to be mounted on the rod 15 to turn freely thereabout, each of the bars 17 having openings through which the rod passes. A tire tool carrying bar 17, when operatively connected with the fixture, is located between the upper end of the sleeve 14 and the lower end of the head 16. At the upper side of each of the tire tool bars 17, a generally U-shaped bracket 18 is secured with openings through opposite sides thereof for the detachable connection therewith of a handle 19 at one end, by means of which handle any bar 17 and the tire tool carried thereby, connected and associated with the apparatus, may be turned around the rod 15 about the vertical axis thereof.

In the use of the tire removing apparatus a wheel having a rim 20 and with a tire casing 21 thereon, within which is a collapsed inner tube 22, is located over the apparatus and the handle 7 turned until an edge of the rim 20 is gripped between the rim engaging members 5 and 9. At the same time the sleeves 10 and 14 are automatically centered within the wheel. The collapsed inner tube 22 permits a bead 21a of the outer casing 21 to be forced inwardly as much as is necessary for such attachment, as shown in Fig. 1.

In many instances the beads 21a of the outer casing more or less adhere to the steel wheel rim through rust or other weather exposure effects. Under such circumstances, the bead preferably is first broken loose from the rim using a tool attached to the tool carrying bar 17, substantially like that shown in Figs. 4, 5 and 6. At the outer end of the bar 17 the tire tool is permanently secured, comprising a horizontal section 23 which is turned downwardly a distance in a generally vertical somewhat curved section 24 and terminates in an inwardly turned angularly disposed finger 25. The length of the tool carrying bar 17 and the tool connected to it is such that the finger 25 may be hooked underneath the edge of the upper side of the rim 20. Then by moving the bar 17 by means of the handle 19 around the axis of the rod 15, the moving finger portion 25 continuously forces the bead 21a away from its adjacent retaining rim. Of course, initially the entrance of the finger 25 between the rim and the bead 21 is done by any suitable entrance of a flattened bar having a more or less tapered edge initially separating said bead and rim at one point in their circumference.

Thereafter, to remove the rim the rod 15 is removed, also the bar 17 carrying the first described tool, being replaced by a bar 17 and attached tire tool such as shown in Figs. 9, 10, and 11. On the tool carrying bar 17 the tool itself is riveted at and extends beyond the outer end thereof, consisting of the flat bar 31 which is partially twisted as at 32, shaped with a hump 33 and bent downwardly and inwardly to terminate in an arm 34 there is a projection 35, and substantially midway between said projection and the hump 33, a second projection 36. The bead at the upper side of the wheel rim (Fig. 1) is engaged by the finger 35 and forced outwardly and also by the projection 36 so as to lift said bead upwardly over hump 33 disengaging it from the rim, on turning the bar 17, to which said tire removing tool is attached, about the axis of the rod 15.

To replace a tire on the wheel, the tool secured at the outer end of the bar 17 is that shown in Figs. 7 and 8. It includes a horizontal flat bar 26 located at the upper side of the bar 17 and permanently secured thereto, turned down in a vertical leg 27 beyond the outer end of the bar 17, and terminating in an inwardly turned hook 28 which is adapted to come within the edge of the wheel rim 20. A horizontal flanged wheel 29 is mounted on the outer end portion of the bar 17 and has its outer edges closely adjacent the vertical leg, 27. A roller 30 in a vertical plane is secured at the outer side of and mounted upon the leg 27, substantially opposite the hook 28. The roller 30 is disposed back of and follows the roller 29 when bar 17 is moved in the direction indicated by the arrow. The flange on the flanged roller 29, and against which roller bead 21a bears, holds said bead from upward movement, and pushes bead 21a beyond edge of rim, while the roller 30 following behind forces the bead downward and gives clearance for it to slip over rim 20.

In the construction described, wheels and tires of different diameters and other dimensions may be serviced by the one supporting fixture, and with the use of a plurality of tire removing tools each attached to a tool carrying bar 17. By adjusting the sleeve 14 in a vertical direction the tools are properly adjusted with respect to the upper bead of the tire casing 21 which is to be acted upon.

The structure is very practical and useful and has so proven in practical operation.

The invention is defined in the appended claims and is to be considered comprehensive of all forms of structure coming within their scope.

We claim:

1. In a structure of the class described, a supporting fixture over which a rim, adapted to have a tire mounted thereon is adapted to be placed, said supporting fixture at one end and beyond the center of any rim located thereover having outwardly diverging arms, a rim engaging means on each of said outwardly diverging arms adapted to engage the outer edge of a tire rim at one side, two spaced bars included in said supporting fixture extending away from said arms and paralleling a diameter of a wheel rim placed thereover, a third rim engaging member slidably mounted on said bars, manually operable means for moving said third rim engaging member to force it against a tire carrying rim to securely clamp the rim in connection with the supporting fixture, an extensible center post slidably mounted on said bars, means connecting said center post with said manually operable means for moving it one-half of the distance of said movable rim engaging means to thereby locate the post at the center of a tire rim connected with said fixture, with the post extending through said rim, said post including a lower sleeve with which said manually operable means is connected for moving the sleeve to different positions on said bars, a second and upper sleeve threaded at its lower end portion into the upper end of the first sleeve, a rod extending through the second sleeve rotatably mounted thereon, clamping means into which the lower end of said rod is screwed located underneath said bars and drawn into clamping connection therewith by rotating said rod, said rod extending above the upper end of the second sleeve and a head connected to the upper end of said rod, said rod being adapted to pass through one end of a tool carrying bar located between the upper end of the second sleeve and the lower end of said head.

2. In a structure of the class described, a supporting fixture over which a rim adapted to have a tire mounted thereon is adapted to be placed, said supporting fixture at one end and beyond the center of any rim located thereover having outwardly diverging arms adapted to engage the outer edge of a tire rim at one side, two spaced bars included in said supporting fixture extending away from said arms and paralleling a diameter of a wheel rim placed thereover, a third rim engaging member slidably mounted on said bars, manually operable means for moving said third rim engaging member to force it against a tire carrying rim to securely clamp the rim in connection with the supporting fixture, an extensible center post slidably mounted on said bars, means connecting said center post with said manually operable means for moving it one-half of the distance of said movable rim engaging means to thereby locate the post at the center of a tire rim connected with said fixture and with the post extending through said rim, means for adjusting said post to extend or retract it vertically, means at the upper end of the post for the detachable rotatable connection of a tool carrying bar thereto with the inner end portion of said bar rotatably mounted on said post to turn about it, said bar at its outer end adapted to carry a tire bead engaging tool, said manually operable means for moving the movable rim engaging means on said bars comprising, a rod having a threaded portion passing through said third rim engaging member, and a reduced end portion extending from said threaded portion to and through the lower end of said first sleeve and having a threaded connection therewith, the pitch of the threads of which are one-half the pitch of the threads passing through said movable tire rim engaging member, and said rod at its outer end having means for manually turning it.

RUSSELL G. BOURDON.
NAPOLEON X. DEROUIN.

REFERENCES CITED

The following references are of record in the file of this patent:

UNITED STATES PATENTS

| Number | Name | Date |
|---|---|---|
| 2,378,955 | Teegarden | June 26, 1945 |
| 2,413,010 | Teegarden | Dec. 24, 1946 |
| 2,421,856 | Teegarden | June 10, 1947 |